(12) United States Patent
Music

(10) Patent No.: US 10,343,591 B2
(45) Date of Patent: Jul. 9, 2019

(54) METHOD AND DEVICE FOR THE AUTOMATED ADAPTATION OF A BRIGHTNESS OF AT LEAST ONE LIGHT FOR A VEHICLE

(71) Applicant: Robert Bosch GmbH, Stuttgart (DE)

(72) Inventor: Amar Music, Nehren (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 15/702,957

(22) Filed: Sep. 13, 2017

(65) Prior Publication Data

US 2018/0079351 A1 Mar. 22, 2018

(30) Foreign Application Priority Data

Sep. 20, 2016 (DE) .................. 10 2016 218 013

(51) Int. Cl.
| | |
|---|---|
| *B60Q 1/14* | (2006.01) |
| *G08G 1/056* | (2006.01) |
| *G08G 1/0962* | (2006.01) |
| *G08G 1/0967* | (2006.01) |

(52) U.S. Cl.
CPC .............. *B60Q 1/143* (2013.01); *G08G 1/056* (2013.01); *G08G 1/09623* (2013.01); *G08G 1/09626* (2013.01); *G08G 1/096725* (2013.01); *G08G 1/096775* (2013.01)

(58) Field of Classification Search
CPC .......... B60Q 1/14; B60Q 1/143; G08G 1/056; G08G 1/09626; G08G 1/09623; G08G 1/096725; G08G 1/096775
See application file for complete search history.

(56) References Cited

U.S. PATENT DOCUMENTS

| | | | | |
|---|---|---|---|---|
| 5,890,083 | A * | 3/1999 | Franke | G01S 3/784 348/118 |
| 2011/0112719 | A1* | 5/2011 | Marumoto | G01F 9/02 701/33.4 |
| 2013/0242102 | A1* | 9/2013 | Tsuchiya | G08G 1/166 348/148 |
| 2016/0325753 | A1* | 11/2016 | Stein | B60W 40/06 |
| 2017/0330464 | A1* | 11/2017 | Yoo | B60Q 1/30 |

* cited by examiner

*Primary Examiner* — Thai Pham
(74) *Attorney, Agent, or Firm* — Norton Rose Fulbright US LLP; Gerard Messina

(57) ABSTRACT

A method and a device for the automated adaptation of a brightness of at least one light for a vehicle. The method includes a step of determining a position and/or a moving direction of the vehicle relative to a first and/or second national territory; a step of ascertaining data that represent a brightness requirement for the at least one light as a function of the position and/or moving direction of the vehicle; and a step of the automated adaptation of the brightness of at least one light as a function of the ascertained data.

18 Claims, 3 Drawing Sheets

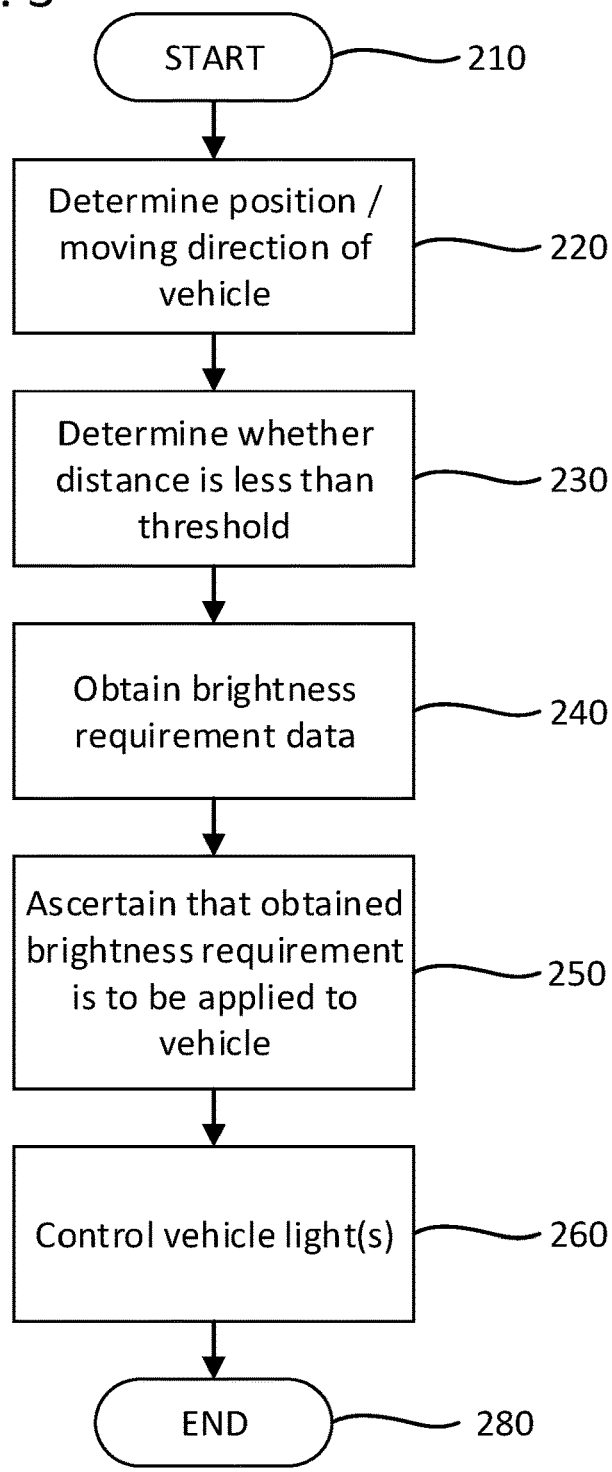

METHOD AND DEVICE FOR THE AUTOMATED ADAPTATION OF A BRIGHTNESS OF AT LEAST ONE LIGHT FOR A VEHICLE

CROSS REFERENCE

The present application claims the benefit under 35 U.S.C. § 119 of German Patent Application No. DE 102016218013.4 filed on Sep. 20, 2016, which is expressly incorporated herein by reference in its entirety.

FIELD

The present invention relates to a method, as well as to a device for the automated adaptation of a brightness of at least one light for a vehicle, the method including a step of determining a position and/or a moving direction of the vehicle, a step of ascertaining data as a function of the position and/or the moving direction of the vehicle, and a step of the automated adaptation of the brightness of at least one light as a function of the ascertained data.

SUMMARY

The method according to the present invention for the automated adaptation of a brightness of at least one light for a vehicle includes a step for determining a position and/or a moving direction of the vehicle relative to a first and/or second national territory. Also included is a step for ascertaining data that represent a brightness requirement for the at least one light as a function of the position and/or moving direction of the vehicle and a step for the automated adaptation of the brightness of at least one light as a function of the ascertained data.

Here, an advantage may be derived in that the automated adaptation of the brightness relieves the driver of the vehicle of the responsibility, so that he/she is no longer able to either forget to perform the adaptation or incorrectly undertake the same. There are sometimes substantial differences among the requirements, especially with regard to different national territories. It is, therefore, difficult for a driver of a vehicle to have an overview of all regulations, so that violating a requirement can lead to stiff fines.

Another advantage may be derived in that the driver is no longer distracted by thoughts as to whether or not the brightness of the at least one light is correctly adjusted for the particular country. This has a positive effect on driving safety.

The position of the vehicle is preferably determined by ascertaining the first and/or second national territory in which the vehicle is located.

This is advantageous since it allows a direct adaptation of the brightness.

The moving direction of the vehicle is preferably determined by sensing whether the vehicle undershoots a first distance to a predefined second distance to a border between the first national territory and the second national territory.

Here, the advantage is derived that an adaptation may be performed in time before entering into a national territory. This lessens the risk of a fine still having to be paid at a control just shortly after the border. Furthermore, the early adaptation increases the driver's satisfaction and confidence in the method since, in response to the adaptation, he/she already receives an early acknowledgment that the method is functioning, protecting him/her from a sometimes stiff fine.

A GPS sensor is preferably used to ascertain the first and/or the second national territory and/or the first distance to the border.

This is particularly advantageous from a financial perspective, since, today, and even more so in the future, nearly every vehicle is equipped with appropriate GPS sensors, whereby no further costs incur since existing sensors may be used.

The first and/or the second national territory and/or the first distance to the border are/is preferably ascertained by a road-sign recognition.

This has the advantage of allowing for short-term variations in the route that compel the vehicle to cross the border, for example.

The ascertainment by road-sign recognition is preferably used as a plausibility check on the ascertainment by the GPS sensor.

Here, the stability of the method is especially advantageous with regard to errors in the ascertainment.

In an especially preferred specific embodiment, the data are ascertained by retrieving them from an external server, and/or by retrieving them from a device in the vehicle, in particular a navigation system.

Retrieving the data relevant to the method from an external server ensures that current data are always retrieved. This enables short-term variations in the brightness requirements for the at least one light to also be considered. The advantage of retrieving the data from a system in the vehicle is that, even without a communications system, the requisite data are available and may be quickly and reliably accessed.

In an especially preferred specific embodiment, the automated adaptation is performed for the brightness of the at least one light in that the brightness is reduced as a function of the ascertained data, only upon crossing the border from the first national territory into the second national territory, or in that the brightness is increased as a function of the ascertained data already before crossing the border from the first national territory into the second national territory.

This is especially beneficial since the thus performed adaptation leads to an extended brightness phase for the at least one light, which, on the one hand, is advantageous for driving safety, and, on the other hand, bolsters the driver's support for the method.

The device according to the present invention for adapting a brightness of at least one light for a vehicle includes first means for determining a position and/or a moving direction of the vehicle relative to a national territory. Also included are second means for ascertaining data, which represent a brightness requirement for the at least one light, as a function of the position and/or moving direction of the vehicle, and third means for adapting the brightness of the at least one light as a function of the ascertained data.

In an especially preferred specific embodiment, the first means and/or the second means and/or the third means are designed for implementing a method in accordance with at least one of the method claims.

Advantageous embodiments of the present invention are described herein.

BRIEF DESCRIPTION OF THE DRAWINGS

Exemplary embodiments of the present invention are illustrated in the figures and are explained in greater detail below.

FIG. 3 shows purely exemplarily an exemplary embodiment in the form of a flow chart.

DETAILED DESCRIPTION OF EXAMPLE EMBODIMENTS

Figure 1:
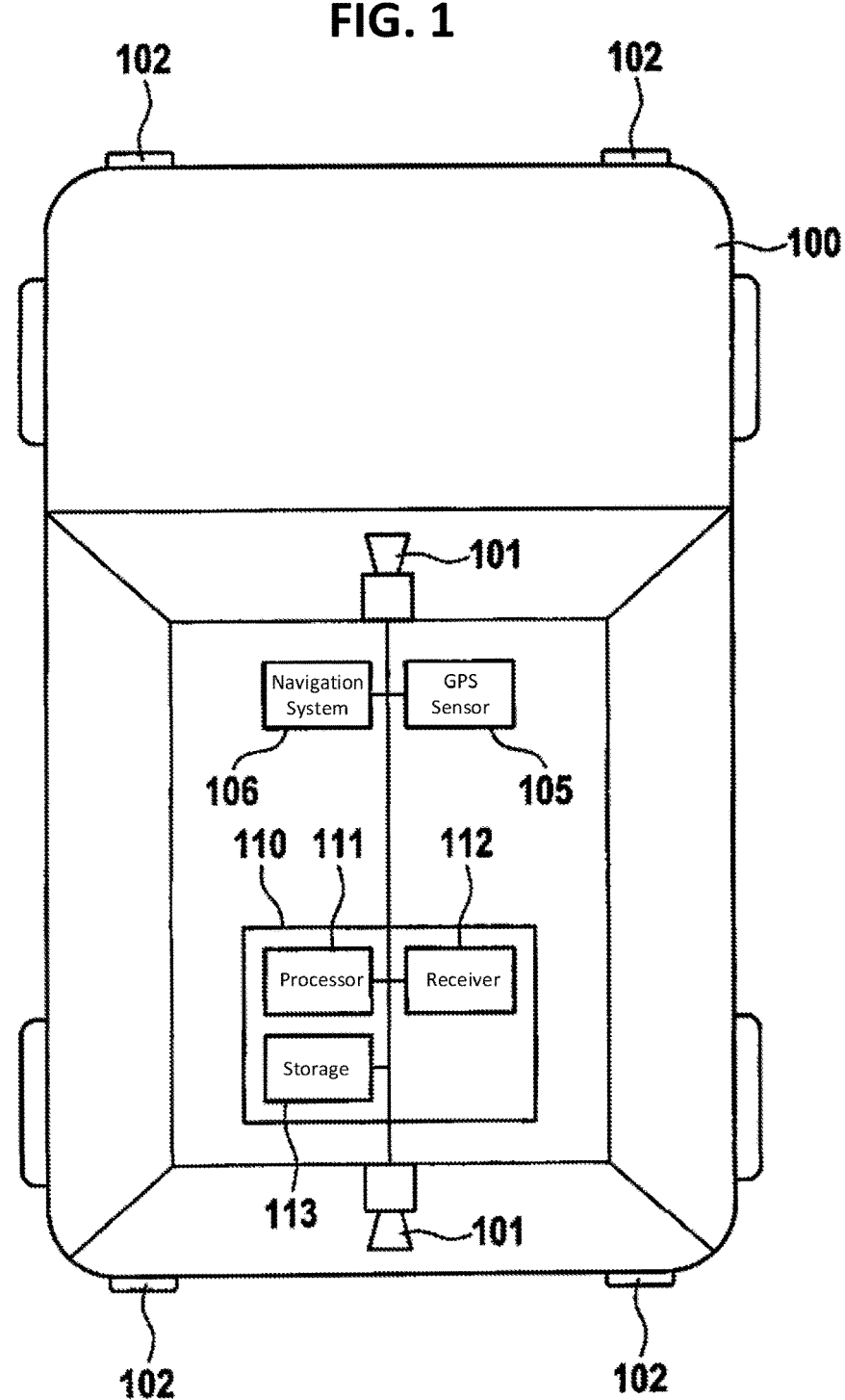
FIG. 1 shows purely exemplarily a vehicle that includes the device according to the present invention for implementing the method according to the present invention.

FIG. 1 shows a vehicle 100 that includes a device 110 for implementing a method 200 in accordance with the present invention.

In addition, vehicle 100 includes lights 102, these possibly being front lights and/or rear lights; in the case of front lights 102, it being possible to distinguish, for example, among the brightness levels between high beam and low beam. Another specific embodiment provides that the brightness of lights 102 also be continuously variable.

Vehicle 100 also includes a road-sign recognition 101. This is understood to mean at least one sensor—for example, a camera—that is designed for detecting and analyzing road signs. An image of a traffic sign is captured, for example, that indicates in the form of a road sign that a border 330 between a first national territory 310 and a second national territory 320 is approaching. The road-sign recognition is thereby designed to recognize the content and analyze it accordingly, for example, using a processor, working memory, a hard disk and suitable software,—such as object detection programs.

The vehicle also includes a GPS sensor 105 that is designed for providing signals indicating position 121 and/or moving direction 122 of vehicle 100.

This may be included in another device 106, such as a navigation system. Another specific embodiment provides that GPS sensor 105 also be part of a device specific thereto that is designed for ascertaining position 121 and/or moving direction 122 of vehicle 100 and for supplying a signal that includes this information to other devices—such as device 110.

In this context, the device 110 is designed, for example, to sense whether vehicle 100 undershoots a first distance d1 to a predefined second distance d2 from border 330 between first national territory 310 and second national territory 320. In this approach, for example, a predefined value, which represents distance d2 between vehicle 100 and border 330, may be stored in device 106. This value may thereby also vary as a function of different national territories 310, 320. This value, together with the requirements, may also be data obtained by receiver 112.

Vehicle 100 also includes a device 106 in the form of a navigation system, for example, that is designed for supplying data that includes a brightness requirement for at least one light 102. When working with a navigation system, these data may be stored as additional information relating to individual, stored national territories 310, 320, for example.

Device 110 of vehicle 100 includes a processor 111 for determining 220 a position 121 and/or a moving direction 122 of vehicle 100. The processor 111 may access device 106 and/or GPS sensor 105 for determining position 121 and/or moving direction 122. As already described, device 106, for example, may supply a signal that is processed by processor 111 using a storage 113, such as a working memory or a hard disk and executing suitable programs in such a way that position 121 and/or moving direction 122 is determined relative to a first and/or second national territory 310, 320 on the basis of which to automatically adapt the brightness of at least one light 102. For example, position 121 and/or moving direction 122 may be stored as coordinates in a map, this map also being an integral part of device 106, designed as a navigation system, for example.

In addition, device 110 includes receiver 112 for obtaining 240 data that represent a brightness requirement for the at least one light 102. Receiver 112 may thereby be designed, for example, for capturing signals from an external server 300 and/or also radio waves. Alternatively, the receiver can be one that is already present in vehicle 100 and be used in the sense of method 200. Furthermore, receiver 112 is designed for supplying a signal as a function of the obtained data to processor 111 for analyzing with regard to the brightness requirements for the at least one light 102.

In this context, the obtained data include one or a plurality of brightness requirements for at least one light 102 of a vehicle 100 in the first and/or second national territory. If vehicle 100 approaches a border 330 between a first and second national territory 310, 320, the requirement being specified in second national territory 320 that at least the low beam always be turned on, then this information is included in the data. These data may be transmitted, for example, by master stations 300, provided for that purpose, to receiver 112. The requirements are legal requirements in the particular national territory. An example is those specified by the Road Traffic Code in Germany.

Processor 111 is also configured for controlling 260 the at least one light 102 for adjusting the brightness of the at least one light 102 as a function of the obtained data, for example, by evaluating a signal from the receiver 112 and the camera 101 and/or GPS sensor 105, and for adapting the brightness of the at least one light 102 accordingly.

Figure 2:
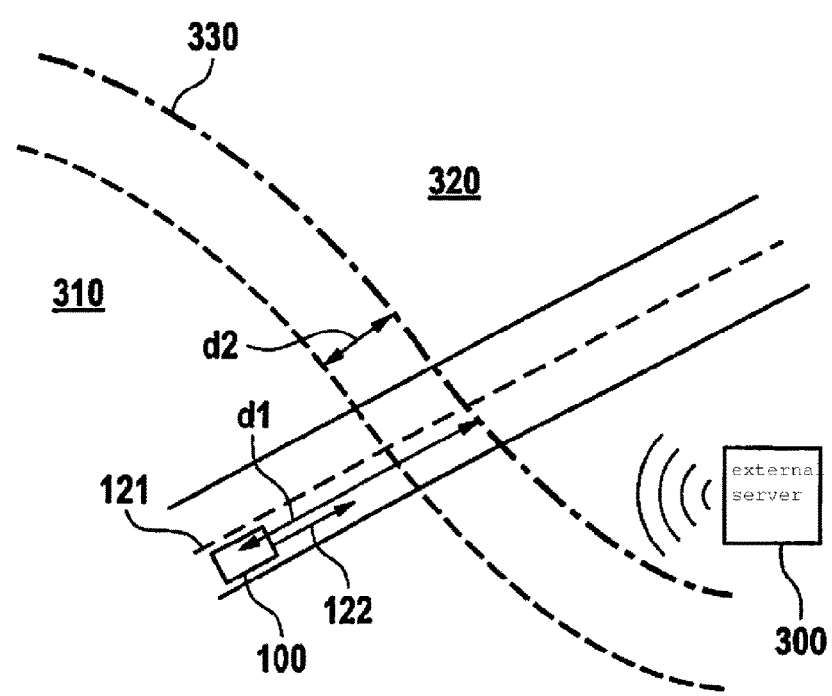
FIG. 2 shows purely exemplarily an exemplary embodiment.

FIG. 2 shows an exemplary embodiment. In this instance, within first national territory 310—indicated here by position 121 and moving direction 122—vehicle 100 approaches border 330 between first national territory 310 and second national territory 320. Method 200 according to the present invention may thereby begin, for example, in response to first distance d1 between vehicle 100 and border 330 being less than a predefined second distance d2 in such a way that border 330 is inevitably crossed if vehicle 100 drives on without turning back, which means that it is necessary to adapt the brightness of the at least one light 102 of vehicle 100 in order to avoid fines, for example. Another specific embodiment provides that the approaching border crossing be sensed by road-sign recognition 101.

The information about how the brightness adaptation is to be performed in order for the brightness of the at least one light 102 to conform to the requirements of national territory 320, is transmitted by an external server 300 and received by receiver 112 of vehicle 100.

FIG. 3 shows an exemplary embodiment in the form of a flow chart. Method 200 begins in step 210. In step 220, a position 121 and/or a moving direction 122 of vehicle 100 is determined relative to a first and/or second national territory 310, 320. In step 230, whether the distance d1 of vehicle 100 from second national territory 320 is less than distance d2 is determined. In step 240, data are obtained that represent a brightness requirement for the at least one light 102 as a function of position 121 and/or moving direction 122 of vehicle 100. In step 250, that the brightness requirement is to be applied to vehicle 100 is ascertained based on distance d1 being less than distance d2. In step 260, the automated control of the brightness of at least one light 102 is performed as a function of the obtained data. Method 200 ends in step 280.

What is claimed is:

1. A method for adapting a brightness of at least one light of a vehicle, the method comprising:
    determining, by a processor, a position of the vehicle and a moving direction of the vehicle, relative to a border of a first national territory, wherein the determination is based on at least one of a Global Positioning System (GPS) signal from a GPS sensor of the vehicle and a signal from a camera representing an image of a road sign identifying a border to the first national territory;
    determining, by the processor and based on the position of the vehicle and the moving direction of the vehicle, that a distance of the vehicle from the first national territory is less than a predefined threshold distance and that the vehicle is traveling towards the first national territory;
    obtaining, by the processor and (1) from a local storage device or (2) via a wireless receiver from an external server, data identifying a brightness requirement of the first national territory;
    ascertaining, by the processor, that the brightness requirement of the first national territory is to be applied to the at least one light in response to the determination that (1) the distance of the vehicle from the first national territory is less than the predefined threshold distance and (2) the moving direction of the vehicle is towards the first national territory; and
    in response to the ascertainment that the brightness requirement of the first national territory is to be applied to the at least one light, the processor automatically controlling the at least one light to change the brightness of the at least one light from a low brightness level to a high brightness level or from the high brightness level to the low brightness level in accordance with the brightness requirement of the first national territory identified by the obtained data.

2. The method as recited in claim 1, wherein the determined position of the vehicle is within a second national territory.

3. The method as recited in claim 1, wherein the determination of the position of the vehicle is based on the GPS signal from the GPS sensor.

4. The method as recited in claim 3, wherein the determination of the position of the vehicle relative to the first national territory is also based on the road sign as a plausibility check on the determination that was based on the GPS signal of the GPS sensor.

5. The method as recited in claim 1, wherein the determination of the position of the vehicle and the direction of the vehicle relative to the border of the first national territory is based on the road sign.

6. The method as recited in claim 1, wherein the data are obtained via the wireless receiver from the external server.

7. The method as recited in claim 1, wherein the change of the brightness is an increase of the brightness while the vehicle is in a second national territory, before the vehicle crosses the border into the first national territory.

8. The method as recited in claim 1, wherein the data are obtained from the local storage device.

9. The method as recited in claim 1, wherein the change of the brightness is a decrease of the brightness of the vehicle immediately upon the vehicle crossing the border from a second national territory into the first national territory.

10. A system of a vehicle, the system comprising:
    at least one of (a) a camera and (b) a Global Positioning System (GPS) sensor;
    at least one light; and
    a device for adapting a brightness of the at least one light;
    wherein:
        the device includes:
            at least one of a local storage and a wireless receiver; and
            a processor programmed with software that is executable by the processor and that, when executed by the processor, causes the processor to perform a method, the method comprising:
                determining a position of the vehicle and a moving direction of the vehicle, relative to a border of a first national territory;
                determining, based on the position of the vehicle and the moving direction of the vehicle, that a distance of the vehicle from the first national territory is less than a predefined threshold distance and that the vehicle is traveling towards the first national territory;
                obtaining, (1) from the local storage or (2) via the wireless receiver from an external server, data identifying a brightness requirement of the first national territory;
                ascertaining that the brightness requirement of the first national territory is to be applied to the at least one light in response to the determination that (1) the distance of the vehicle from the first national territory is less than the predefined threshold distance and (2) the moving direction of the vehicle is towards the first national territory; and
                in response to the ascertainment that the brightness requirement of the first national territory is to be applied to the at least one light, automatically controlling the at least one light to change the brightness of the at least one light from a low brightness level to a high brightness level or from the high brightness level to the low brightness level in accordance with the brightness requirement of the first national territory identified by the obtained data; and
        the determination of the position of the vehicle is based on at least one of (a) a GPS signal from the GPS sensor and (b) a signal from the camera representing an image of a road sign identifying the border of the first national territory.

11. The system as recited in claim 10, wherein the determined position of the vehicle is within a second national territory.

12. The system as recited in claim 10, wherein the determination of the position of the vehicle is based on the GPS signal from the GPS sensor.

13. The system as recited in claim 12, wherein the determination of the position of the vehicle relative to the first national territory is also based on the road sign as a plausibility check on the determination that was based on the GPS signal of the GPS sensor.

14. The system as recited in claim 10, wherein the determination of the position of the vehicle and the direction of the vehicle relative to the border of the first national territory is based on the road sign.

15. The system as recited in claim 10, wherein the data are obtained via the wireless receiver from the external server.

16. The system as recited in claim 10, wherein the data are obtained from the local storage.

17. The system as recited in claim 10, wherein the change of the brightness is an increase of the brightness while the vehicle is in a second national territory, before the vehicle crosses the border into the first national territory.

18. The system as recited in claim 10, wherein the change of the brightness is a decrease of the brightness of the vehicle immediately upon the vehicle crossing the border from a second national territory into the first national territory.

* * * * *